US008241115B2

(12) United States Patent
Hamlin et al.

(10) Patent No.: US 8,241,115 B2
(45) Date of Patent: Aug. 14, 2012

(54) MULTIPLE KEY FAILOVER VALIDATION IN A WAGERING GAME MACHINE

(75) Inventors: Vernon W. Hamlin, Lisle, IL (US); Mark J. Saletnik, Mount Prospect, IL (US); Jorge Luis Shimabukuro, Las Vegas, NV (US); Anussorn Andy Veradej, Las Vegas, NV (US); Jun Wang, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 719 days.

(21) Appl. No.: 12/442,467

(22) PCT Filed: Oct. 9, 2007

(86) PCT No.: PCT/US2007/021681
§ 371 (c)(1),
(2), (4) Date: Mar. 23, 2009

(87) PCT Pub. No.: WO2008/045487
PCT Pub. Date: Apr. 17, 2008

(65) Prior Publication Data
US 2010/0041471 A1    Feb. 18, 2010

Related U.S. Application Data

(60) Provisional application No. 60/828,685, filed on Oct. 9, 2006, provisional application No. 60/829,909, filed on Oct. 18, 2006.

(51) Int. Cl.
*A63F 9/24* (2006.01)

(52) U.S. Cl. .......................................... 463/29; 463/42

(58) Field of Classification Search ............... 463/20–42
See application file for complete search history.

(56) References Cited

U.S. PATENT DOCUMENTS

| 7,798,900 B2 * | 9/2010 | Nguyen et al. ............... 463/29 |
| 7,972,214 B2 * | 7/2011 | Kinsley et al. ............... 463/42 |
| 2004/0198494 A1 * | 10/2004 | Nguyen et al. ............... 463/42 |
| 2006/0046824 A1 | 3/2006 | Silva et al. |
| 2010/0041471 A1 * | 2/2010 | Hamlin et al. ............... 463/25 |

FOREIGN PATENT DOCUMENTS

| EP | 1480102 A2 | 11/2004 |
| EP | 1486922 A2 | 12/2004 |
| EP | 1489567 B1 | 8/2007 |
| WO | WO-0167218 A1 | 9/2001 |
| WO | WO-03073386 A2 | 9/2003 |
| WO | WO-2006099234 A1 | 9/2006 |

OTHER PUBLICATIONS

"International Application Serial No. PCT/US2007/21681, Written Opinion mailed May 15, 2008", 4 pgs.
"International Application Serial No. PCT/US2007/21681, International Search Report mailed May 15, 2008", 5 pgs.
"International Application Serial No. PCT/US2007/21681, International Preliminary Examination Report mailed Mar. 2, 2009", 8 pgs.

* cited by examiner

*Primary Examiner* — Masud Ahmed
(74) *Attorney, Agent, or Firm* — Schwegman, Lundberg & Woessner, P.A.

(57) ABSTRACT

A computerized wagering game system includes a gaming module comprising gaming code which is operable when executed on to conduct a wagering game on which monetary value can be wagered, and a security module operable to check the authenticity of a wagering game component using at least one of two or more available encryption keys.

20 Claims, 4 Drawing Sheets

MULTIPLE KEY FAILOVER VALIDATION IN A WAGERING GAME MACHINE

RELATED APPLICATIONS

This patent application is a U.S. National Stage Filing under 35 U.S.C. 371 from International Patent Application Serial No. PCT/US2007/021681, filed Oct. 9, 2007, and published on Apr. 17, 2008 as WO 2008/045487 A2 and republished as WO 2008/045487 A3, which claims the priority benefit of U.S. Provisional Patent Application Ser. No. 60/828,685 filed Oct. 9, 2006 and entitled "MULTIPLE KEY FAILOVER VALIDATION IN A WAGERING GAME MACHINE" and to U.S. Provisional Patent Application Ser. No. 60/829,909 filed Oct. 18, 2006 and entitled "MULTIPLE KEY FAILOVER VALIDATION IN A WAGERING GAME MACHINE", the contents of which are incorporated herein by reference in their entirety.

FIELD OF THE INVENTION

The invention relates generally to encryption and digital signatures in computerized wagering game machines, and more specifically to use of multiple keys in computerized wagering game machines.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. It is not uncommon for audio voices to provide instruction and help, and to provide commentary on the wagering game being played. Music and environmental effects are also played through speakers in some wagering game systems to enhance or complement a theme of the wagering game. These sounds typically accompany video presentation of the wagering game on a screen, which itself often includes animation, video, and three-dimensional graphics as part of presentation of the wagering game.

Modern wagering game system also typically employ a network connection enabling each wagering game machine to communicate with other computerized systems on the network. For example, a progressive area slot controller will coordinate the progressive slot jackpot and coordinate selection of a winner by communicating with each wagering game machine that is a part of the progressive jackpot pool. Computers are used for other purposes, such as for accounting, for tracking rates of game play, and for receiving service requests or malfunction notification. The wagering game machine can be the recipient of information, such as where configuration information like an audio volume level is sent or specified via the network connection. Software updates such as new multimedia files, new game code, operating system changes, and other such data can also be sent via the network connection to a wagering game machine.

But, because significant amounts of money are being wagered on the wagering game machines, the security of network communications, and of the data stored in a wagering game machine, is an important consideration. A cheat who is able to intercept or falsify messages on the network or change data stored in the wagering game machine could conceivably change the operation or configuration of wagering game machines, as well as interfere with accounting for specific wagering game machines or progressive slot machine controllers.

It is therefore desirable to ensure secure communication between a wagering game machine and other computerized systems in a network, and to ensure authenticity of data stored in a wagering game machine.

SUMMARY

One example embodiment of the invention comprises a computerized wagering game system including a gaming module comprising gaming code which is operable when executed on to conduct a wagering game on which monetary value can be wagered, and a security module operable to check the authenticity of a wagering game component using at least one of two or more available encryption keys.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system including a gaming module comprising gaming code which is operable when executed on to conduct a wagering game on which monetary value can be wagered, and a security module operable to check the authenticity of a wagering game component using at least one of two or more available encryption keys. In some embodiments, authenticity is checked via a software process running in at least one of a pre-boot execution environment, a BIOS environment, or a booting operating system environment. Authentication in some embodiments comprises using each of the two or more available encryption keys to attempt authentication of the game component until the component is authenticated or all of the two or more available keys have been tried.

Figure 1:
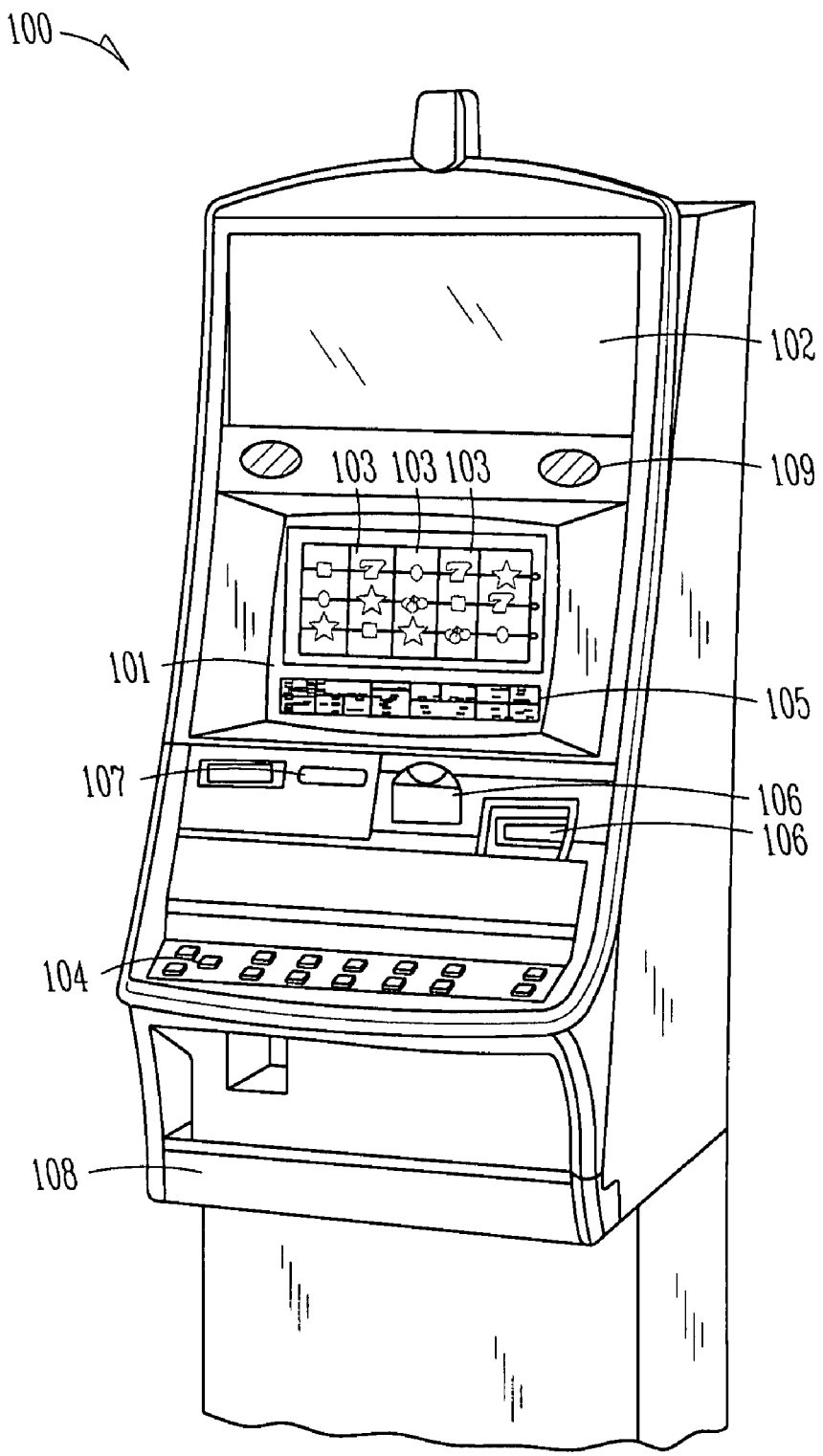
FIG. 1 shows a computerized wagering game machine, as may be used to practice some example embodiments of the invention.

FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A game of chance is implemented using software within the wagering game, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold'em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions.

Figure 2:
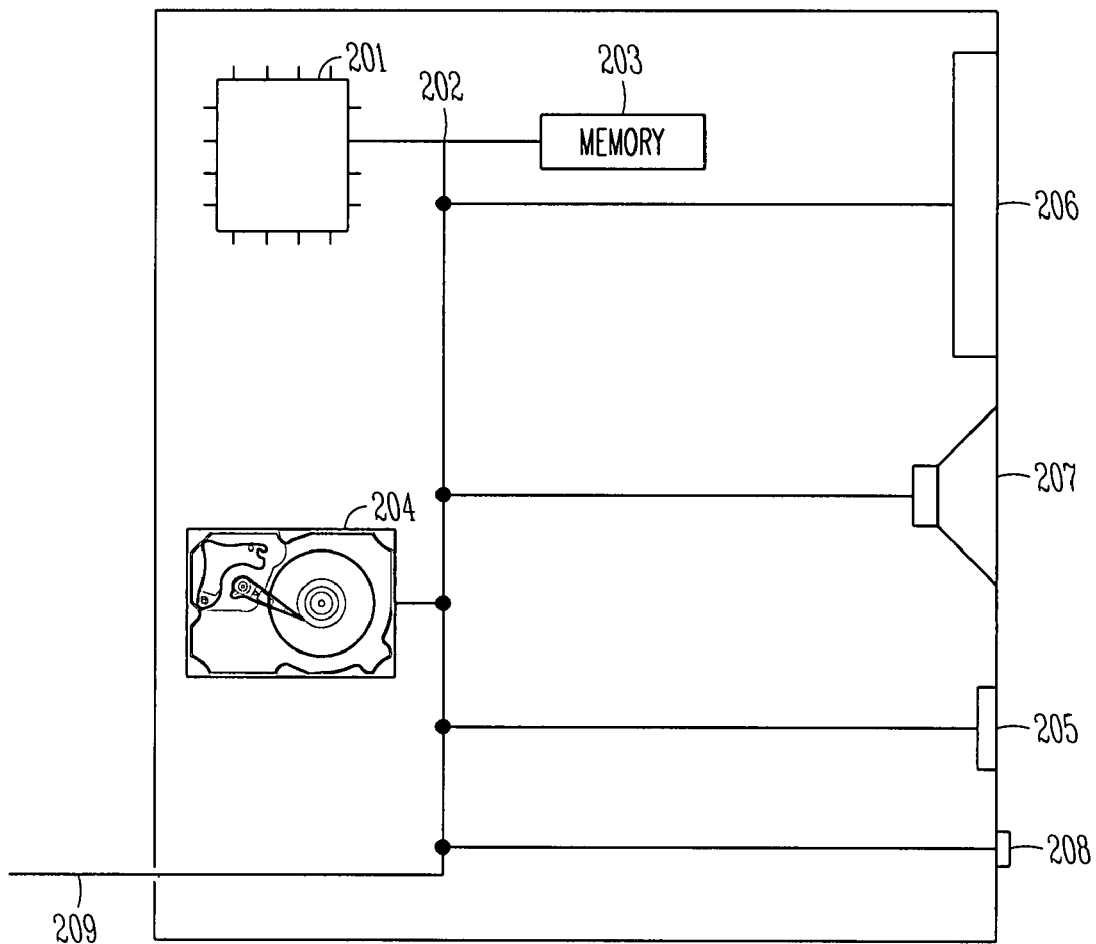
FIG. 2 is a flowchart of asymmetric public key encryption algorithm key exchange using an interlock protocol, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering gape server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof.

The network connection 209 is operable in some embodiments of the invention to receive and transmit information that is desirably confidential, or that would benefit from authentication of the message or the sender. Examples include a wagering game system sending accounting information to a central accounting server, or a progressive slot machine controller tracking the amount wagered on wagering machines in the progressive area network for calculation of the progressive jackpot. Various embodiments of the invention use encryption techniques, such as message authentication, key management, hash functions, and other methods to ensure the security or authenticity of information communicated over the wagering game network. Similarly, the nonvolatile storage 204 contains in some embodiments data including program code for executing a wagering game, or other data that is desirably stored securely. This information is authenticated or secured in various embodiments by use of similar encryption techniques, including digital signatures, hash functions, and other such methods. Various embodiments of the invention rely on algorithms such as these being implemented in hardware or in software in the wagering game systems and in other systems such as servers or controllers, such as within a software driver executing on each system in the wagering game network.

Encryption of data typically takes place with a symmetric or asymmetric algorithm, designed to obscure the data such that a specific key is needed to read or alter the data. A symmetric algorithm relies on agreement of a secret key before encryption, and the decryption key is either the same as or can be derived from the encryption key. Secrecy of the key or keys is vital to ensuring secrecy of the data in such systems, and the key must be securely distributed to the receivers before decryption such as via a secure key exchange protocol. Common symmetric algorithms include DES, 3DES or triple-DES, AES, Blowfish, Twofish, IDEA, RD2, RC4, and RC5.

Public key algorithms, or asymmetric algorithms, are designed so that the decryption key is different than and not easily derivable from the encryption key. The term "public key" is used because the encryption key can be made public without compromising the security of data encrypted with the encryption key. Anyone can therefore use the public key to encrypt a message, but only a receiver with the corresponding decryption key can decrypt the encoded data. The encryption key is often called the public key, and the decryption key is often called the private key in such systems. Such systems can also be used to digitally sign a document where the signer uses the secret private key to encrypt the document or some portion of it such as a one-way hash of the document, and then publishes the encrypted message. Anyone can use the signer's published or known public key to decrypt the signed message, confirming that it was encrypted or signed by the owner of the public/private key pair. Common public key algorithms include RSA, Diffie-Hellman, and ElGamal.

One-way hash functions take an input string and derive a fixed length hash value. The hash value is typically of significantly shorter length than the document, and is often calculated by application of some type of data compression algorithm. The functions are designed so that it is extremely difficult to produce an input string that produces a certain hash value, resulting in a function that is considered one-way. Data can therefore be checked for authenticity by verifying that the hash value resulting from a given one-way hash function is what is expected, making authentication of data relatively certain. Hash functions can be combined with other methods of encryption or addition of secret strings of text in the input string to ensure that only the intended parties can encrypt or verify data using the one-way hash functions. Common examples of one-way hash function encryption include MD2, MDC2, MD4, MD5, and SHA.

Digital signatures can be implemented using such technologies, such as where a signing party encrypts a hash value of a document or volume of data with a private key from an asymmetric key pair. The receiving party can easily authenticate the signature by decrypting the encrypted hash value with the signer's public key and comparing the hash value to the volume, ensuring that the data is both authentic and unaltered since it was signed.

A variation on one-way hash functions is use of Message Authentication Codes, or MAC. A MAC comprises a one-way hash function that further includes a secret key, such that knowledge of the key is necessary to encode or verify a given set of data. MACs are particularly useful where the hash value would otherwise be subject to unauthorized alteration or replacement, such as when transmitted over a public network or a network that would be difficult to protect, such as a very large network linking hundreds of computerized wagering game machines in a large gaming facility.

Encryption can be used in its various forms to obscure the content of a message for transmission over a wagering game network, so that a third party is not so easily able to monitor network traffic and read or alter messages sent over the network. The ability of various wagering game systems to communicate with one another securely relies in many embodiments on the secure distribution or storage of keys, such as distributing a symmetric key securely to both parties wishing to use the key for secure communication, or distributing asymmetric keys such as public keys in a manner such that the identity of the public key owners can be firmly established. This is achieved in some embodiments by establishing chain of trust from one trusted system to another, so that once a single system is declared to be authentic and trustworthy, it can "vouch" for other systems such as by authenticating their public keys, user-unique identifiers, asymmetric keys, or other such data.

Such methods of key management are often handled via a trusted third party known as a Certificate Authority, which is a service provider that signs certificates carrying public keys and identification information as a means of authenticating the data contained in the certificate to other parties. The certificate authority is typically a party well-known and trusted to all involved, and in some environments such as Internet web pages is preconfigured as a trusted authority in web browsers before distribution.

Key management is also an important aspect of implementing encryption technology in many applications. Periodically changing or rotating encryption keys over time reduces the amount of time a cheat has to try to derive or calculate a secret key while it is still being actively used, and reduces the amount of data available to the cheat if a key is compromised. Some systems therefore not only rotate keys, but negotiate or exchange a new encryption key each time communication is established with another party, using protocols commonly known as key exchange protocols.

In one example, a shared secret symmetric key is present in each of two systems connected to the wagering game network. The machine requesting secure communication requests a session key from a trusted third party, such as a key server on a trusted server. The key server generates a session key and encrypts two copies of it using the secret symmetric keys of the two systems wishing to communicate securely. The key server sends the encrypted keys to the first system, which decrypts the copy encrypted with its asymmetric key and sends the other copy on to the other system. The other system receives and decrypts its key, and the two systems use the session key to communicate securely. This system is able to securely deliver a session key to each of the two parties desiring a secure communications session, but requires a trusted third party that knows the secret symmetric keys of the communicating parties. New keys or other information can thereby be distributed to networked wagering game machines, ensuring that each wagering game system has the needed encryption keys securely transferred and stored.

In another example of key exchange, a public key or asymmetric key algorithm is used to exchange keys between two wagering game network systems desiring a secure communications channel. A first system A can simply get the public key of another system B from a key management authority such as a trusted public key server, and encrypt a randomly generated session key using that public key. System A then sends the encrypted session key to B, which decrypts the session key using its private key, and uses the decrypted session key to communicate with system A. But, such a system is vulnerable to someone intercepting messages such as public keys and encrypted messages on the network and substituting their own messages, so that the "man in the middle" is able to intercept, read, and alter any messages sent between the two systems.

Implementation of encryption protocols into a wagering game system is performed in some embodiments by adoption of standards such as the Internet Protocol Security (IPSec) protocol set or another such standard. IPSec comprises a set of protocols including secure packet transmission protocols and key exchange protocols, and can therefore be used for a variety of encryption functions such as secure communication, authentication, and key management. IPSec works on the network connection of a computer system, so it has the ability to encrypt or protect packets sent over the network whatever their content. IPSec also includes the key exchange protocol known as Internet Key Exchange (IKE), which is used to establish a secure association for encrypted packet exchange between two or more systems. IKE uses a Diffie-Hellman based key exchange to set up a shared session secret, from which cryptographic keys are derived. Either preshared secrets or public key methods as described earlier are used to mutually authenticate communicating parties, such that the identity of a party can be confirmed before establishing a session key.

More simple protocols such as Secure Socket Layer (SSL) can also be used to provide system authentication and encryption of network data. SSL includes a negotiation element in which the communicating parties negotiate which encryption standards will be used. Supported options include public key algorithms such as RSA and Diffie-Hellman, symmetric key algorithms such as RC4, IDEA, DES, AES, and has functions such as MD5 and SHA. It further supports message authentication codes, and is commonly used to support secure communication for electronic commerce conducted over the Internet. SSH is typically implemented in the session or transport layers of a network stack, and so is capable of providing encryption services to a network connection independent of the specific application requesting network communication.

But, because encryption technologies and preferred algorithms change over time, and because keys may be changed over time to ensure security of the keys and to enhance the security of more newly released wagering game machine components and data, it is anticipated that the keys used in wagering game systems will change over time. The wagering game systems in some embodiments of the invention therefore are designed to recognize multiple keys and algorithms, to ensure compatibility with older game components. For example, in a digital signature system using a trusted root certificate securely stored in each wagering game machine to verify a digital signature on game code before recognizing or executing the game code, the trusted root certificate may be updated over time to ensure security and secrecy of the private key in the key pair used to sign hash functions of data to digitally sign the data. In another example, a symmetric key stored securely in a trusted platform module is occasionally replaced, so that the key's security can be maintained even if a prior key becomes publicly known or has been used long enough that its strength or secrecy is suspect.

Figure 3:
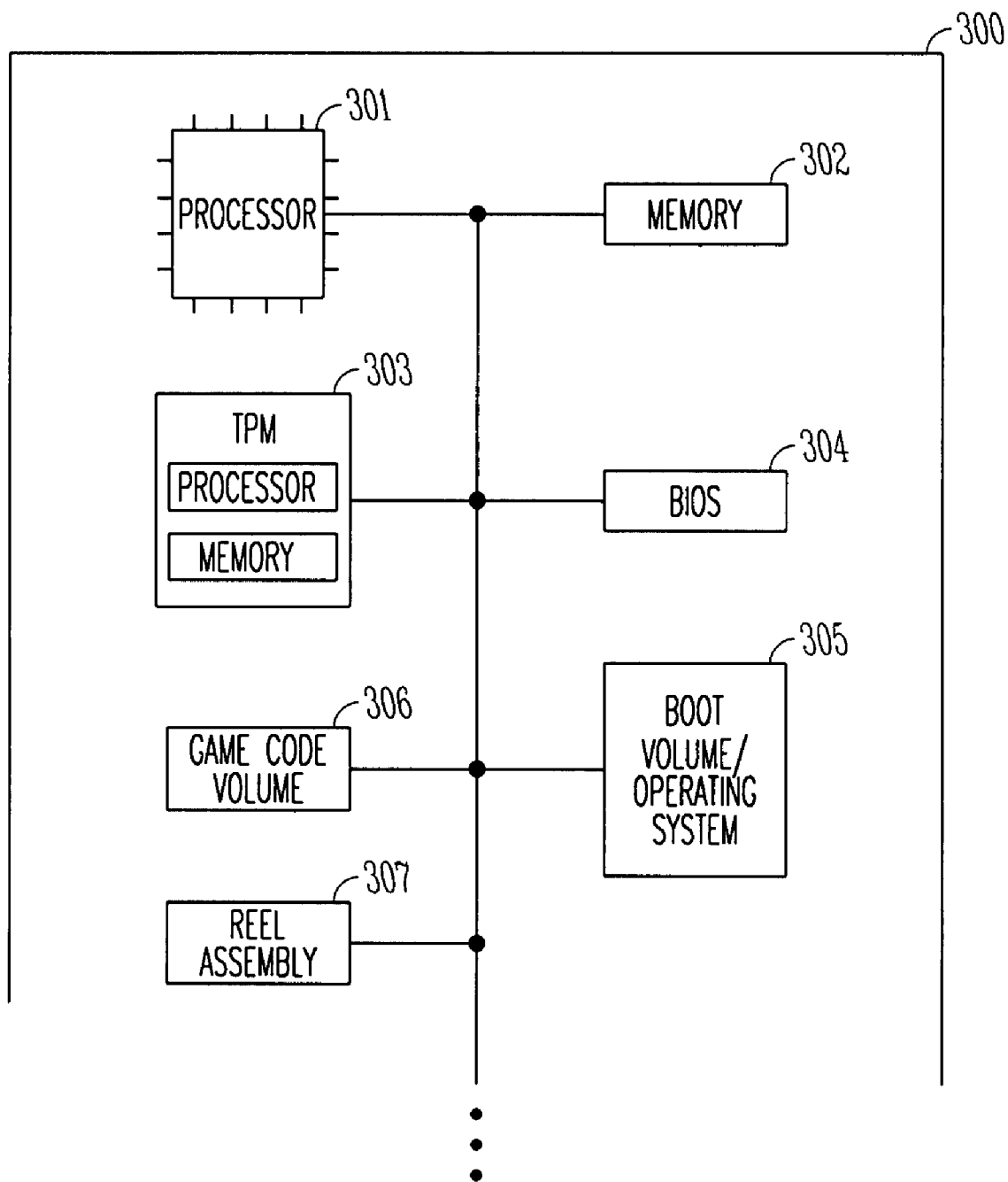
FIG. 3 is a block diagram of a wagering game system architecture including a group of keys securely stored in a keyring within a trusted platform module, consistent with some example embodiments of the invention.

FIG. 3 is a block diagram of a wagering game system architecture including a group of keys securely stored in a keyring within a trusted platform module, consistent with an example embodiment of the invention. In this example, a processor 301 and main system memory 302 are coupled via a bus to other components, including trusted platform module 303. The trusted platform module of this example is operable to securely perform various encryption and authentication functions, including such functions as secure key generation and storage, and computation for various encryption functions such as generating or checking a digital signature. In other embodiments, keys will be stored in a ROM, in BIOS, or in other storage and encryption functions will be performed by another processor. Here, the bus also links the processor, memory, and trusted platform module to a BIOS, or basic input/output system used to control a booting computer until an operating system loads. The computer boots an operating system from boot volume 305, and loads and executes game code from game code volume 306. Finally, a mechanical reel assembly 307 is coupled to the bus, and is used in game play to present the results of a reel slot machine game When the computer boots, the authenticity of the data stored in the wagering game machine is authenticated by checking a digital signature of a hash value of each of the volumes to be authenticated, and certain hardware components such as the reel assembly are also authenticated by checking a digital signature stored in the mechanical reel assembly and accessed via the mechanical reel assembly's electronic interface.

For each component of the wagering game system to be authenticated, including hardware elements such as the reel assembly 307, software elements such as the boot volume 305, and other components such as the BIOS 304, the wagering game system uses the one or more public keys stored in the secure memory of the trusted platform module applied to a hash value of the data volume or a hash value, serial number, or other component of mechanical elements such as the reel assembly to decrypt a digital signature. The decrypted digital signature includes in this example a hash value of the signed volume or a serial number of a physical component such as the reel slots, so that the successful decryption proves the hash value was encrypted by the owner of the public key and the hash value itself proves the volume or other identifier has been unaltered since signing. The decrypted hash value or serial number is compared to the calculated hash value or the serial number read from the slot reels, and if the value is the same the component is determined to be authentic.

But, encryption technologies and keys change with time, and the ability of a wagering game system to authenticate a particular component is dependent on its ability to work with changing keys and technologies. The signer of a wagering game, an operating system, or other wagering game system component may change keys over time, such as when a wagering game authority or game manufacturer signs a wagering game component but changes its keys periodically to ensure security or to track the time of signing. Similarly, as computing resources continue to improve, the encryption technology used or the length of keys used may change to ensure a continued level of security. For this reason, the system of FIG. 3 is able to receive updated encryption keys, and is operable to try each encryption key stored to confirm a digital signature.

In one such example, when the wagering game system first starts it attempts to authenticate the BIOS 304 by trying to use the first stored public key in a digital signature keyring stored in the trusted platform module 303 to decrypt a digital signature for the BIOS. If the first key fails to decrypt the digital signature, the next key in the keyring is used to attempt authentication. This process continues until a key is used to successfully authenticate the wagering game component, or until all available keys have been tried unsuccessfully and the component is deemed inauthentic.

The keys used to attempt authentication are limited in some embodiments to keys meeting certain criteria. For example, keys of a certain length that are associated with a certain protocol may be the only keys appropriate for decrypting a certain digital signature, and so only those keys will be used to attempt authentication. In another example, at least some characteristic of the key used is not known before authentication succeeds, and so any key deemed suitable for attempting decryption will be tried in sequence to authenticate the wagering game system component.

Once the BIOS of FIG. 3 is authenticated in a starting computer, the other components, including in this example the boot volume 305, the game code volume 306, and the reel assembly 307 are authenticated using the same process of sequentially trying each available appropriate key until the component is either authenticated or all keys have been tried. In this example, a public key issued by a wagering game manufacturer may be used to successfully authenticate the boot volume and operating system 305, while a gaming authority public key is used to authenticate the game code volume at 306. A second wagering game manufacturer key is used to authenticate the identity of the reel assembly, which in some embodiments may be a key that is older, uses a different encryption technology, or is updated less often than keys used to authenticate executable code such as the boot volume. For each authenticated element of the wagering game system, the process of trying each appropriate and available key is repeated until each element is authenticated or is deemed inauthentic.

Figure 4:
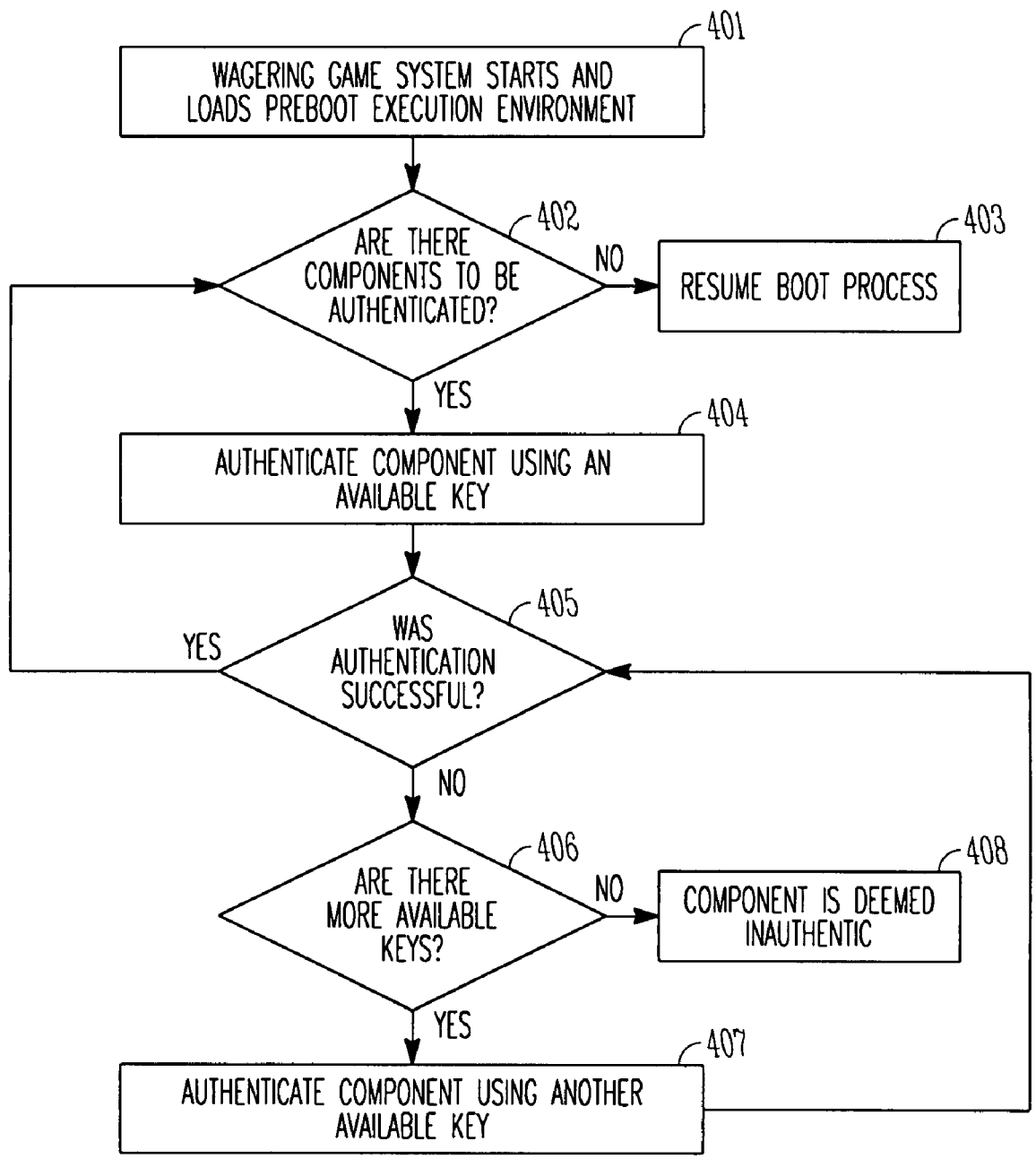
FIG. 4 is a flowchart of one example method of checking the authenticity of a number of wagering game components in a wagering game system, consistent with some example embodiments of the invention.

FIG. 4 is a flowchart of one example method of checking the authenticity of a number of wagering game components in a wagering game system. At 401, a wagering game system begins the boot process by loading a preboot execution environment (PXE), including an authentication program designed to check the authenticity of various components of the wagering game system, including the BIOS, a boot volume containing an operating system, and a wagering game code volume. The authentication program checks to see what components are to be authenticated at 402, and if there are no components to be authenticated the boot process is resumed at 403. In this example, there are components remaining to be authenticated, so authentication of the first component, the wagering game system BIOS, is performed at 404. Authentication is performed using a selected available key that is determined to be appropriate for the encryption process being used, which in some cases is selected sequentially from among a number of available keys appropriate for the given technology. If the authentication was successful as determined at 405, the authentication process determines whether there are other wagering game system components that need to be authenticated before the boot process resumes at 403.

In this example, authentication of the second component, the operating system boot volume, fails at 405. The authentication process then determines that there are other available authentication keys that appear to be appropriate for authentication of the boot volume at 406, and attempts authentication of the boot volume using another available key at 407. This process continues until there are no more keys available, at which point the component is deemed inauthentic at 408, or until authentication is deemed successful at 405 and the authentication process determines whether there are other components such as the wagering game code volume to be authenticated at 402.

The above example takes place in the context of a pre-boot execution environment authentication program, and uses available encryption keys stored in software or hardware, such as a nonvolatile memory or a trusted platform module. In other embodiments, the authentication process will be managed by other combinations of hardware and software, and may involve other elements such as human intervention or instruction. For example, a variation of the above process generates a tilt condition if any component is deemed inauthentic, and an alarm is sounded, an alert is sent via the wagering game system's network connection, and the system's display flashes a warning message.

The examples presented here illustrate how a wagering game system having more than one encryption key can use more than one key in attempting to authenticate wagering game system components. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system, comprising:
a gaming module comprising gaming code which is operable to present a wagering game on which monetary value can be wagered; and
a security module operable to check the authenticity of a wagering game component using one key at a time from two or more available encryption keys, wherein each of the two or more available encryption keys provides unique key values, wherein the one key at a time is sequentially selected from the two or more available encryption keys, and wherein the security module is operable to attempt authentication of the wagering game component using the one key at a time from the two or more available encryption keys until the wagering game component is successfully authenticated or until all of the two or more available encryption keys have been tried.

2. The computerized wagering game system of claim 1, wherein the wagering game component comprises at least one of a BIOS, an operating system, a data volume, wagering game code, and a peripheral device.

3. The computerized wagering game system of claim 1, wherein at least one of the two or more available encryption keys are stored in a trusted platform module.

4. The computerized wagering game system of claim 1, wherein checking the authenticity of the component by using one key at a time from the two or more available encryption keys comprises verifying a digital signature of the wagering game system component.

5. The computerized wagering game system of claim 4, wherein the digital signature of the wagering game system component comprises a digital signature of a hash value of a volume of data.

6. The computerized wagering game system of claim 1, wherein the authentication is performed in at least one of a pre-boot execution environment, a BIOS environment, or a booting operating system environment.

7. A method of operating a computerized wagering game system, comprising:
   presenting a wagering game on which monetary value can be wagered; and
   checking the authenticity of a wagering game component using one key at a time from two or more available encryption keys, wherein each of the two or more available encryption keys provides unique key values, wherein the one key at a time is sequentially selected from the two or more available encryption keys, and wherein authentication of the wagering game component is attempted using the one key at a time from the two or more available encryption keys until the wagering game component is successfully authenticated or until all of the two or more available encryption keys have been tried.

8. The method of operating a computerized wagering game system of claim 7, wherein checking the authenticity of a wagering game component occurs in at least one of a pre-boot execution environment, a BIOS environment, or a booting operating system environment.

9. The method of operating a computerized wagering game system of claim 7, wherein the wagering game component comprises at least one of a BIOS, an operating system, wagering game code, a peripheral device, and a data volume.

10. The method of operating a computerized wagering game system of claim 7, wherein checking the authenticity of the component by using one key at a time from the two or more available encryption keys comprises verifying a digital signature of the wagering game system component.

11. The method of operating a computerized wagering game system of claim 10, wherein the digital signature of the wagering game system component comprises a digital signature of a hash value of a volume of data.

12. The method of operating a wagering game system of claim 7, wherein checking the authenticity of the wagering game system component occurs in a trusted platform module.

13. The method of operating a wagering game system of claim 7, wherein the two or more available keys are stored in a trusted platform module.

14. A machine-readable storage medium with instructions stored thereon, the instructions when executed operable to cause a computerized wagering game system to:
   present a wagering game on which monetary value can be wagered; and
   check the authenticity of a wagering game component using one key at a time from two or more available encryption keys, wherein each of the two or more available encryption keys provides unique key values, wherein the one key at a time is sequentially selected from the two or more available encryption keys, and wherein authentication of the wagering game component is attempted using the one key at a time from the two or more available encryption keys until the wagering game component is successfully authenticated or until all of the two or more available encryption keys have been tried.

15. The machine-readable storage medium of claim 14, wherein checking the authenticity of a wagering game component occurs in at least one of a pre-boot execution environment, a BIOS environment, or a booting operating system environment.

16. The machine-readable storage medium of claim 14, wherein confirming the authenticity of the component by using one key at a time from the two or more available encryption keys comprises verifying a digital signature of the wagering game system component.

17. The machine-readable storage medium of claim 16, wherein the digital signature of the wagering game system component comprises a digital signature of a hash value of a volume of data.

18. The computerized wagering game system of claim 6, wherein a different encryption key from the two or more available encryption keys is used to authenticate each of the pre-boot execution environment, the BIOS environment, and the booting operating system environment.

19. The method of claim 8, wherein a different encryption key from the two or more available encryption keys is used to authenticate each of the pre-boot execution environment, the BIOS environment, and the booting operating system environment.

20. The machine-readable storage medium of claim 15, wherein a different encryption key from the two or more available encryption keys is used to authenticate each of the pre-boot execution environment, the BIOS environment, and the booting operating system environment.

* * * * *